M. BRAY.
RIVETS
No. 180,747.  Patented Aug. 8, 1876.
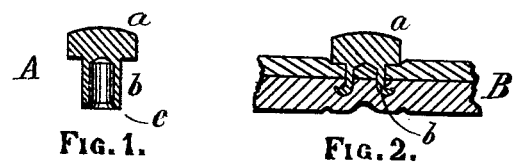
WITNESSES.
N. C. Lombard
Wm P. Edwards
INVENTOR.
Mellen Bray

UNITED STATES PATENT OFFICE.

MELLEN BRAY, OF NEWTON, MASSACHUSETTS.

IMPROVEMENT IN RIVETS.

Specification forming part of Letters Patent No. 180,747, dated August 8, 1876; application filed January 12, 1876.

*To all whom it may concern:*

Be it known that I, MELLEN BRAY, of Newton, in the county of Middlesex and State of Massachusetts, have invented a new and useful Improvement in Rivets and in the method of applying them, of which the following, taken in connection with the accompanying drawings, is a specification:

My invention relates to the construction of tubular rivets, and their application for the purpose of securing together two or more pieces of leather, or other like material; and it consists, first, in constructing a rivet with its shank drilled out, or otherwise made hollow its entire length, or to its head, and having the inner corner of the end of said tubular shank beveled or chamfered, so as to form a sharp annular cutting-edge at the outer corner of a diameter, equal to the diameter of the shank of the rivet, said bevel or chamfer being made at a greater or less angle to the end of said rivet, according to the thickness of the work to which it is to be applied.

My invention further consists in the use, as a means of securing together two or more pieces of leather, or other flexible material, of a tubular rivet, driven through one or more thicknesses of said material, and having its end split and deflected to clinch the same while being driven, and before passing through the last piece of material.

Figure 1 of the drawings is a central longitudinal section of my improved rivet, and Fig. 2 is a similar section of the same rivet, applied to the securing of two pieces of leather together.

The rivet A has a solid head, *a*, and a shank or body, *b*, which is made hollow or tubular its entire length, the metal of said tube being of even thickness, except that its inner corner is cut away or beveled so as to form a cutting-knife edge, *c*, extending around the end or point of the shank, of a diameter equal to the exterior diameter of the shank of the rivet, said bevel being made true and concentric with the bore of the tube by means of a cutting-tool of proper shape, and also at a distinct and well-defined angle to the inner parallel sides of the tube. The bevel which forms the cutting-edge *c* is designed and has the effect to cause the point of the rivet, in passing through the leather B—as it approaches the under strata of the material, where it is condensed by the pressure between the rivet and the anvil, on which it rests—to be turned outward into a direction at right angles, or nearly so, to the surfaces of the material, as shown in Fig. 2.

The distance from the upper surface of the material, at which the spreading and clinching action will commence, may be varied by varying the angle of the bevel which forms the cutting edge *c* to the parallel walls of the tubular shank of the rivet.

There are many places where metal rivets are now used, especially in leather work, that a rivet of this kind, that will effectually and strongly secure the parts together without having the split ends of the tubular rivets clinched over upon the inner or under surface of the material, presenting a more or less rough and uneven surface to the eye, and in many cases to the flesh of the wearer, as in the manufacture of shoes, where a great many rivets are now used, would be useful.

The same objection that applies to the tubular rivets, as heretofore used, applies with even greater force to the solid rivet and burr.

I do not claim, broadly, a tubular rivet, having a sufficiently thin annular edge to cut its own way through the material, as such a rivet was patented to me November 24, 1874; but that rivet was not beveled upon its inner corner and brought to a sharp cutting-edge, but was simply made thin at its edge by drilling out its center to form a tube, its walls remaining substantially parallel, and of an even thickness for the entire length of the tube, and as a consequence it would cut its way directly through the material without any tendency to deflect from a right line and spread outward, till it came in contact with the metal anvil beneath the material, and was split and spread thereby.

What I claim as new, and desire to secure by Letters Patent of the United States, is—

1. As a new article of manufacture, a rivet having a solid head, and a shank made tubular its entire length to its head, and having its inner corner at the end beveled or chamfered, as and for the purposes described.

2. As a means of securing together two or more pieces of leather, or other flexible material, a tubular rivet driven through one or more thicknesses of said material, and having its end split and deflected to clinch the same while being driven, and before passing through the last piece of material, substantially as described.

Executed at Boston, Massachusetts, this 26th day of November, 1875.

MELLEN BRAY.

Witnesses:
N. C. LOMBARD,
WM. P. EDWARDS.